W. A. DORSEY.
TWO WHEELED TRUCK.
APPLICATION FILED JUNE 29, 1915.
1,215,633. Patented Feb. 13, 1917.
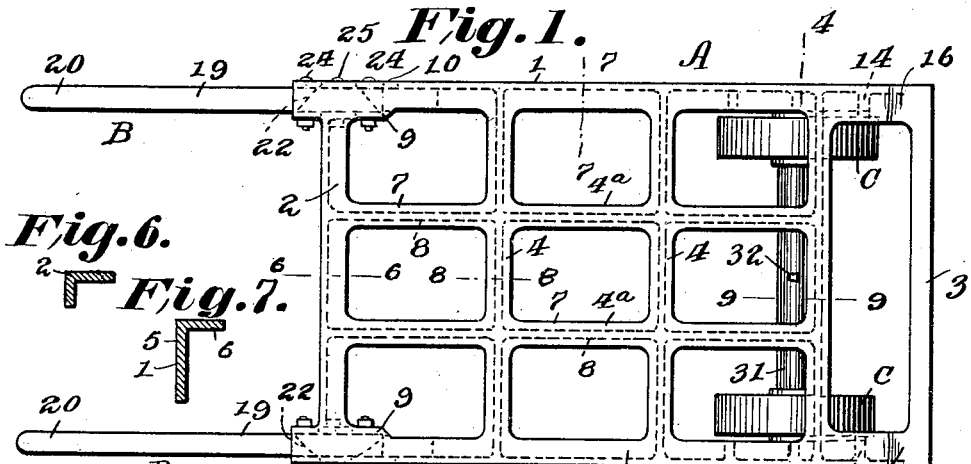
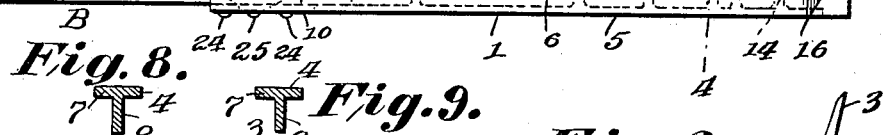
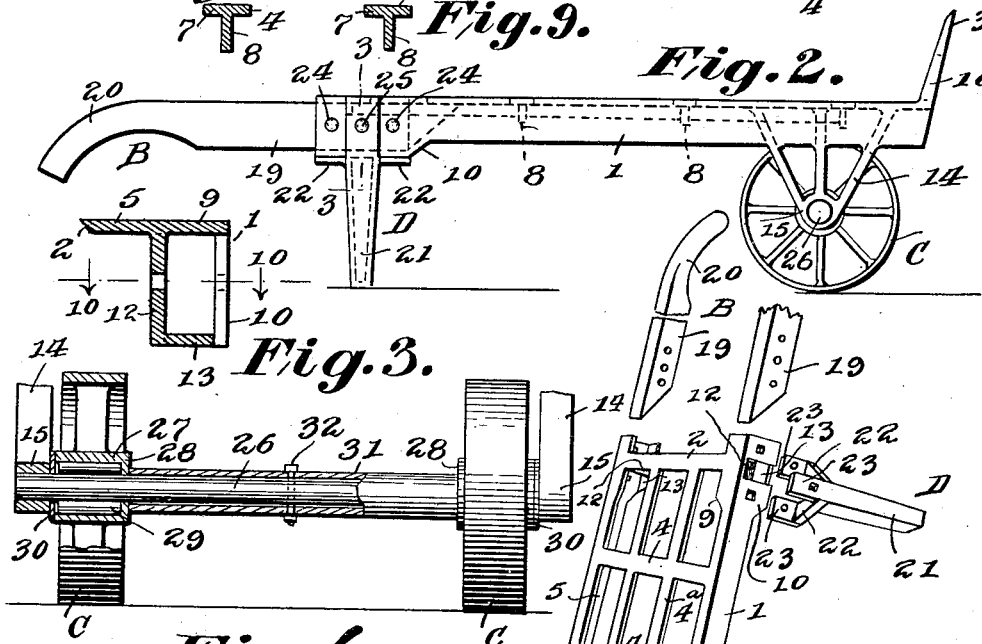
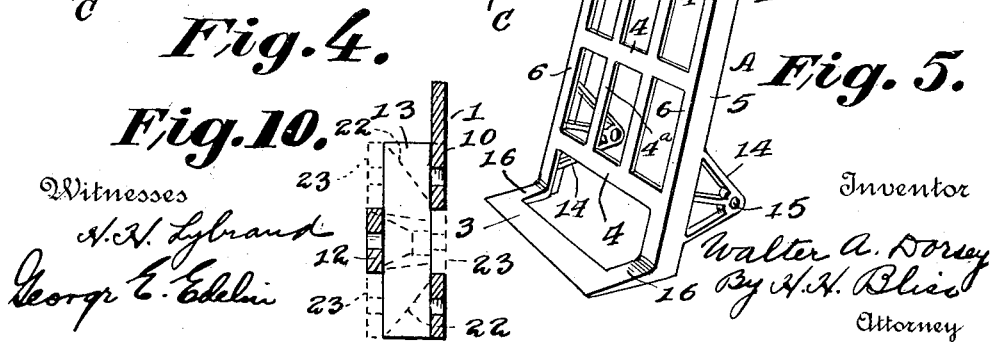
Witnesses
N. H. Lybrand
George E. Edelin
Inventor
Walter A. Dorsey
By H. H. Bliss
Attorney

UNITED STATES PATENT OFFICE.

WALTER A. DORSEY, OF COLUMBUS, OHIO, ASSIGNOR TO THE BONNEY-FLOYD COMPANY, OF COLUMBUS, OHIO, A CORPORATION OF OHIO.

TWO-WHEELED TRUCK.

1,215,633.  Specification of Letters Patent.  Patented Feb. 13, 1917.

Application filed June 29, 1915. Serial No. 37,088.

*To all whom it may concern:*

Be it known that I, WALTER A. DORSEY, a citizen of the United States, residing at Columbus, in the county of Franklin and State of Ohio, have invented certain new and useful Improvements in Two-Wheeled Trucks, of which the following is a specification, reference being had therein to the accompanying drawing.

This invention relates to improvements in two wheeled service trucks of the class used in depots, warehouses, dock structures, and the like.

Figure 1 is a plan view of the truck embodying my improvements;

Fig. 2 is a side elevation;

Fig. 3 is a vertical section on the line 3—3 of Fig. 2;

Fig. 4 is a partial vertical section on the line 4—4 of Fig. 1;

Figs. 5 to 10 show details.

A truck embodying my improvements comprises a main framework, indicated as an entirety by A, handles shown at B secured to the frame, wheels at C, and legs at D.

The framework to which the other parts specified are attached is an integral casting. It comprises the side sills 1, 1, the rear girt 2, the front girt or nose piece and load support 3, and intermediate girts 4, 4. Each of these bars of the main frame is formed in one piece.

The side sills 1, 1 are formed as light angle bars each with a comparatively wide vertical flange 5 and a horizontal top flange 6. The cross girts 4 and the inner sills 4ᵃ also are composed of top horizontal parts 7 and reinforcing vertical webs 8. At the rear ends the flanges of the sill bars 1 are widened both horizontally, as at 9, and vertically, as at 10, and a supplemental wall or flange at 12 is provided extending from the inwardly widened part 9 of the side sill down to a bottom wall 13, which is here added.

The parts 12 and 13, together with the rear end parts of the flanges 5 and 6 of the sills, form two boxes which permit the fitting, bracing and fastening of both the legs D and the handles B. Near the front ends of the sills 1 are the standards 14 which extend down to and furnish bearings 15 at the axis of the wheels. The cross bar 3 at the front ends of the sills is carried by short uprights 16, this bar or nose piece being beveled or tapered to serve, as do the similar bars on ordinary trucks, to pick up boxes or other loads, and assist in turning them onto the truck, and then act to hold them in place thereon.

It will be seen that all of the detailed parts that have been referred to, to wit, the sills 1, 1, with their flanges 5, 6, the rear girt 2, the cross bar or nose piece 3, the intermediate girts 4, 4, the walls 9, 10, 12, 13 of the boxes, the standards 14 and the bearings 15 are all cast in one integral casting, and are ready to have the other parts immediately attached thereto. There is an opening in the outside vertical wall of each box; and the wall section 12 is opposite this opening, the inner wall being cut away at the sides of the part 12. Each handle B is formed with a shank part 19 and hand grasp 20. The shank is of such dimensions that it can be slipped endwise into one of the boxes referred to and be snugly fitted thereto. Each leg D comprises a casting having the leg part 21, which is hollow, or is a U-angle in horizontal section. At the upper end of the leg is a horizontal plate 22 extending forward and backward from the vertical lines of the leg proper, this plate fitting under the box and snugly against its lower surface. 23 are extensions projecting upward from the plate 22. They are of such width that they can be inserted tightly into the openings left in the vertical walls of the box. 24 and 25 are bolts, those at 24 passing through the walls of the box and through the shank 19 of the handle and binding it in place, and that at 25 passing through the projections 23 of the leg and through the handle and binding the leg, handle and base frame tightly together.

The wheels C are mounted to rotate independently of each other around an axle 26, which is supported in the bearings 15 at the lower ends of the standards 14. The wheel hub has the cylinder 27 and the closure 28 at one end, there being a chamber between the sleeve and the axle or bushing tube around the axle. In this chamber is mounted an anti-friction bearing of rollers 29. 30 is a disk or washer between the standard 14 and the wheel hub adapted to take the thrust of the hub and also to hold the parts of the roller bearing in place.

Between the two wheel hubs a spacing tube 31 is placed and tightly set by bolts or set screws 32 to the shaft 26.

It will be seen that I have designed a strong, durable truck and one that is simple in construction, comprising but four units, namely, the frame, the legs, the handles, and the wheels and axle. The base frame and all of its numerous attachments being cast in one solid piece, together with the axle brackets and the sockets for the handles and legs, I obviate the requirement of welding bolts or rivets to secure together its component parts. The axle standards, being cast integrally with the base frame, provide perfectly alined seats for the axle and the wheels. In earlier constructions these are bolted or riveted, and soon become loose and wabbly, the bearings being rapidly destroyed as well as the axle. The axle is free to turn in the bearings and the wear from the rotation of the wheels is evenly distributed. The locking bolt or screw and the spacing and bushing tubes hold the axle against transverse displacement.

The legs are so designed and fitted in the frame boxes that they furnish a bracing against strains in all of the directions in which strains are generally transmitted in such structures. The fastening bolt 25 is not depended on to take any material amount of the strain, as that is taken up by the vertical and horizontal plates and flanges which engage with the box walls. The bolts are reduced to a minimum in number for fastening the handles and the legs firmly in position. All of these advantages grow out of the fact that I have so designed the solid steel cast frame that it includes all of the important structural features necessary for a service truck of this class except the attachment of the wheels, handles and legs.

What I claim is:

1. In a truck of the class described, the wheel-mounted base frame having cross bars and side bars cast integrally together and cast with short longitudinally arranged handle boxes at the rear end of the frame, each box having an outer vertical wall and an inner vertical wall with openings therethrough in combination with short handles, each having its inner ends seated in one of said boxes, and legs D, each having upwardly projecting transversely spaced extensions 23 slidably fitting in the openings in the vertical walls of a box and embracing the inner ends of one of said handles, and fastening devices passing through each handle and through the adjacent box walls and leg.

2. In a two wheeled service truck, the combination of the base frame having the sills, the girts, the nose bar and the boxes at the rear ends of the sills all cast integral in one piece of metal, the handles inserted longitudinally into the rear ends of the said boxes, the legs having horizontally extending braces bearing against the under side of the frame and having vertically extended arms to prevent lateral displacement, fastening devices for the arms and legs, the axle mounted below the front end of the truck and the wheels on the said axle, substantially as set forth.

In testimony whereof, I affix my signature, in presence of two witnesses.

WALTER A. DORSEY.

Witnesses:
HARRY E. WEST,
WILLARD GOODMAN.

Copies of this patent may be obtained for five cents each, by addressing the "Commissioner of Patents, Washington, D. C."